(12) United States Patent
Tanaka

(10) Patent No.: US 6,216,379 B1
(45) Date of Patent: Apr. 17, 2001

(54) FILING DEVICE FOR DEVELOPED X-RAY FILM

(75) Inventor: Hiroyuki Tanaka, Yokohama (JP)

(73) Assignee: NIX Company Ltd., Tokyo (JP)

( * ) Notice: Subject to any disclaimer, the term of this patent is extended or adjusted under 35 U.S.C. 154(b) by 0 days.

(21) Appl. No.: 09/313,994

(22) Filed: May 19, 1999

(30) Foreign Application Priority Data

May 19, 1998 (JP) .................................................. 10-173759
Jun. 23, 1998 (JP) .................................................. 10-211692

(51) Int. Cl.[7] .................................................. A47G 1/06
(52) U.S. Cl. ................................. 40/777; 40/771; 40/775
(58) Field of Search ........................... 40/771, 772, 774, 40/775, 776, 704, 359; 281/31, 38

(56) References Cited

U.S. PATENT DOCUMENTS

| | | | |
|---|---|---|---|
| 1,274,804 | * | 8/1918 | Spitzer .................................. 40/774 |
| 1,387,488 | * | 8/1921 | Helmer .............................. 40/776 X |
| 1,730,883 | * | 10/1929 | Grant ..................................... 40/704 |
| 2,154,510 | * | 4/1939 | King et al. ............................. 40/771 |
| 3,464,135 | * | 9/1969 | Eidinger ............................ 40/771 X |
| 3,848,136 | * | 11/1974 | Seldin .................................. 378/164 |
| 4,171,570 | * | 10/1979 | Seldin ................................... 433/73 |
| 4,196,536 | * | 4/1980 | Westberg .............................. 40/771 |
| 4,333,254 | | 6/1982 | Stevenson . |
| 4,896,027 | * | 1/1990 | Drexler ............................ 40/771 X |
| 4,958,450 | * | 9/1990 | Roberg ................................. 40/771 |
| 5,000,319 | * | 3/1991 | Mermelstein ..................... 40/704 X |
| 5,383,472 | * | 1/1995 | Devlin et al. .................... 378/164 X |

FOREIGN PATENT DOCUMENTS

| | | |
|---|---|---|
| WO 85/03213 | 8/1985 | (EP) . |
| 1 332 255 | 6/1963 | (FR) . |
| 732970 | 7/1955 | (GB) . |

* cited by examiner

Primary Examiner—Terry Lee Melius
Assistant Examiner—James M Hewitt
(74) Attorney, Agent, or Firm—Evenson, McKeown, Edwards & Lenahan, P.L.L.C.

(57) ABSTRACT

A device is provided for filing a developed X-ray film such as a developed dental X-ray film. The filing device is formed of a transparent sheet. The transparent sheet has scale marks applied thereon, and is arranged such that a particular site, such as a tooth, in the X-ray film can be diagnosed using the scale marks. The filing device makes it possible to determine with precision and ease the size, relative position or the like of the particular site without removal of the X-ray film from the filing device.

4 Claims, 13 Drawing Sheets

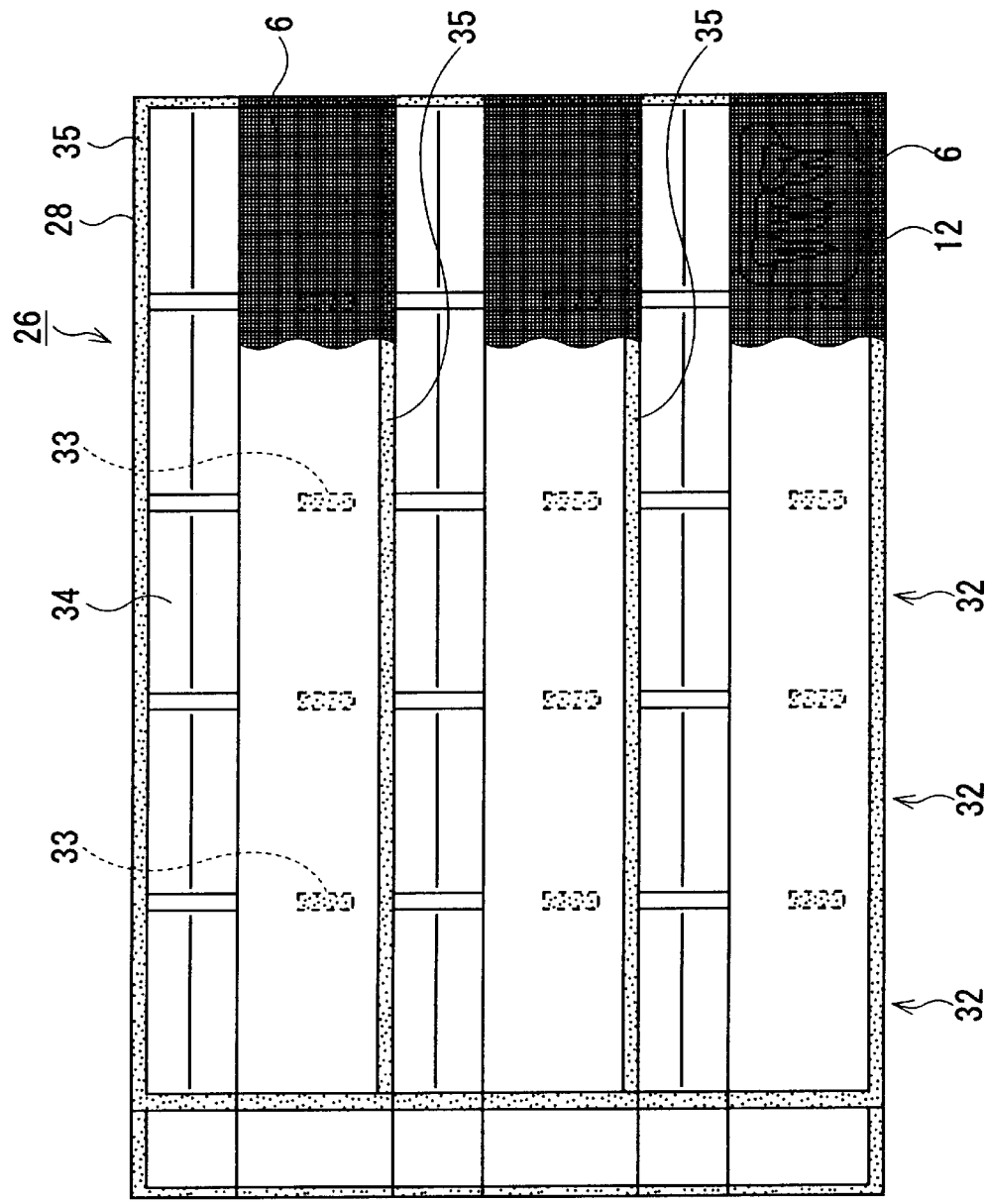

FIG. 7A
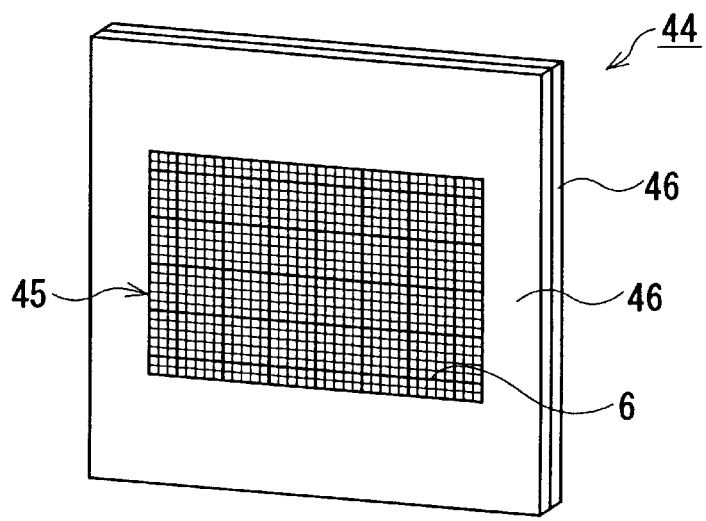
FIG. 7B
FIG. 7C
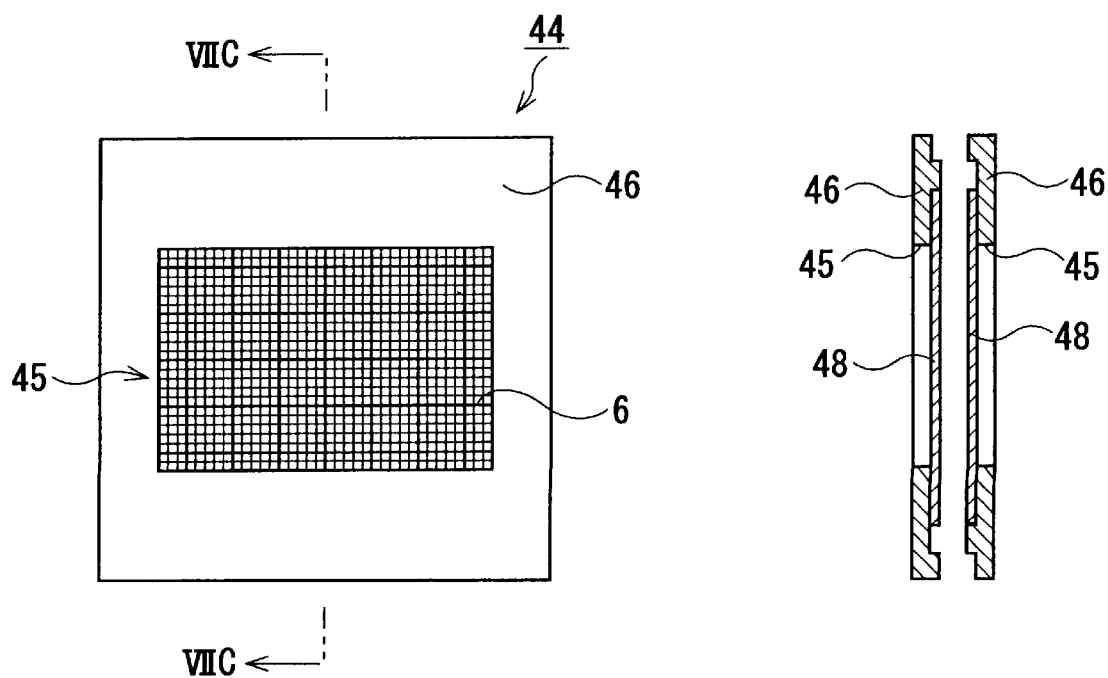

FILING DEVICE FOR DEVELOPED X-RAY FILM

BACKGROUND OF THE INVENTION a) Field of the Invention

This invention relates to a filing device for one or more developed X-ray films (hereinafter called a "developed X-ray film filing device").

b) Description of the Related Art

X-ray photography is widely used especially in the medical field. Exposed X-ray films are developed, and are then stored in or on X-ray film filing devices such as files, folders and slide mounts.

Such X-ray film filing devices include those making use of sheets having light-transmitting properties. Filing devices of this type, with films still filed in or on the devices, permit diagnosis or observation of the films by illuminating the films at the back sides thereof.

Upon diagnosis or observation of a particular site, such as a tooth, in an X-ray film filed in or on an X-ray film filing device of this type, precise determination of the size or relative position of the site requires to remove the film from the filing device and then to affect the diagnosis or observation by using another instrument or device.

SUMMARY OF THE INVENTION

With the foregoing inconvenience in view, the present invention has as an object thereof the provision of an X-ray film filing device which permits precise and easy diagnosis or observation of the size, relative position or the like of a particular site in an X-ray film while the X-ray is still filed in or on the filing device.

To achieve the above-described object, the present invention provides a developed X-ray film filing device for filing a developed X-ray film, which is composed of a transparent sheet having scale marks applied thereon. The transparent sheet is arranged such that a particular site appeared in the X-ray film can be diagnosed using the scale marks.

Filing of the X-ray film in or on the filing device allows a viewer to observe the X-ray film and the scale marks in an overlapped state, so that the size or relative position of the particular site can be precisely and easily determined without removal of the X-ray film from the filing device. Further, measurements can also be performed with ease on teeth (root canal lengths and the like).

BRIEF DESCRIPTION OF THE DRAWINGS

FIG. 1A through FIG. 1F illustrate a developed X-ray film filing device according to a first embodiment of the present invention, in which FIG. 1A is a perspective view, FIG. 1B is a front view, FIG. 1C is a side view, FIG. 1D is a front view showing the filing device in use, FIG. 1E is a cross-sectional view taken in the direction of IE—IE of FIG. 1D, and FIG. 1F is a cross-sectional view similar to FIG. 1E except that a developed X-ray film is held on the back side of a sheet;

FIG. 2A through FIG. 2E depict a developed X-ray film filing device according to a second embodiment of the present invention, in which FIG. 2A is a perspective view, FIG. 2B is a front view, FIG. 2C is a cross-sectional view taken in the direction of IIC—IIC of FIG. 2B, FIG. 2D is a front view showing the filing device in use, and FIG. 2E is a cross-sectional view taken in the direction of arrows IIE—IIE of FIG. 2D;

FIG. 3 is a front view of a developed X-ray film filing device according to a third embodiment of the present invention;

FIG. 7A through FIG. 7E illustrate a developed X-ray film filing device according to a fifth embodiment of the present invention, in which FIG. 7A is a perspective view, FIG. 7B is a front view, FIG. 7C is a cross-sectional view taken in the direction of VIIC—VIIC of FIG. 7B, FIG. 7D is a front view showing the filing device in use, and FIG. 7E is a cross-sectional view taken in the direction of VIIE—VIIE of FIG. 7D;

FIG. 8A through FIG. 8C show a developed X-ray film filing device according to a sixth embodiment of the present invention, in which FIG. 8A is a front view, FIG. 8B is a side view, and FIG. 8C is a rear view;

FIG. 10A through FIG. 10C depict a developed X-ray film filing device according to a seventh embodiment of the present invention, in which FIG. 10A is a front view, FIG. 10B is a side view, and FIG. 10C is a rear view.

DETAILED DESCRIPTION OF THE PREFERRED EMBODIMENTS

Figure 1A:
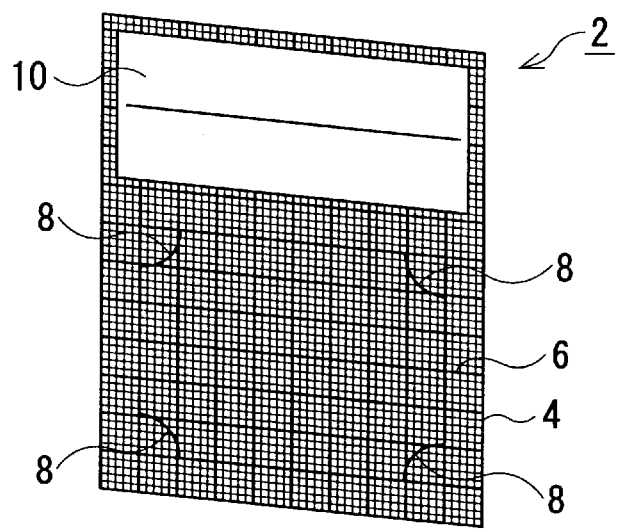
Figures 1B, 1C:
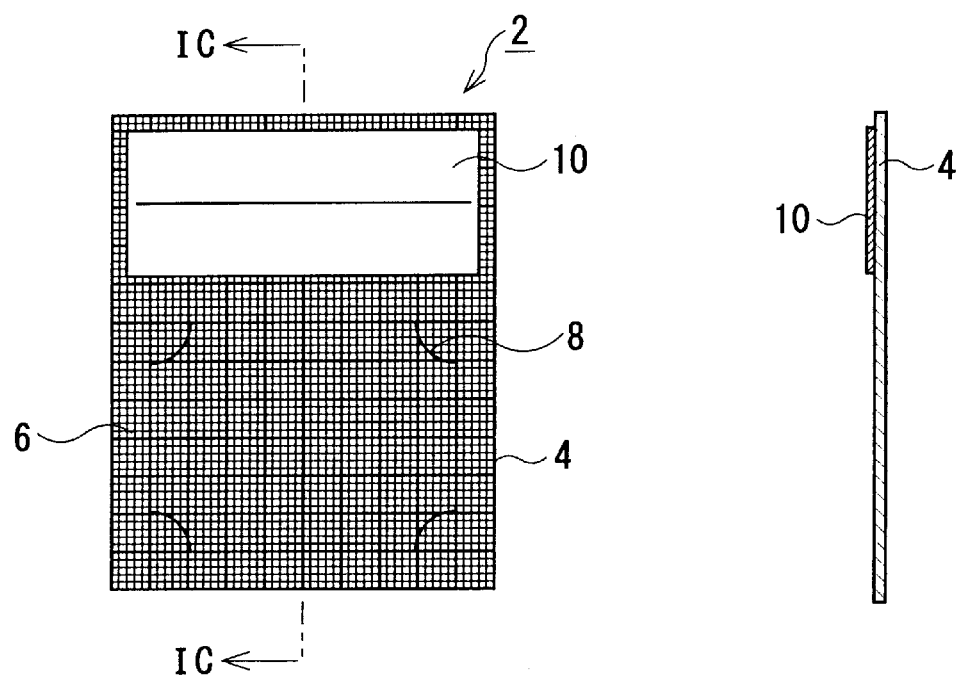

With reference to the accompanying drawings, the developed X-ray film filing devices according to the first to seventh embodiments of the present invention will hereinafter be described. Although the filing devices according to these embodiments are for developed dental X-ray films, filing devices according to the present invention are not limited for use with such developed dental X-ray films but are usable for other developed medical X-ray films.

(First Embodiment)

Referring first to FIG. 1A through FIG. 1F, the developed X-ray film filing device according to the first embodiment of the present invention will be described. The X-ray film filing device, which is designated generally at numeral 2, is made of a sheet 4 having light-transmitting property (for example, transparent PVC sheet), and on the sheet 4, cross-ruled scale marks 6 have been applied at 1 mm intervals, for example, by printing or the like. In the sheet 4, four cuts 8 are formed to hold a dental X-ray film (3×4 cm) by inserting the film at parts thereof. A data sticker 10 is applied on the sheet 4 at a location other than a location where the X-ray film is held in place. For example, the name and sex of a patient, the date and site of photography, etc. may be written on the data sticker 10.

Figure 1D:
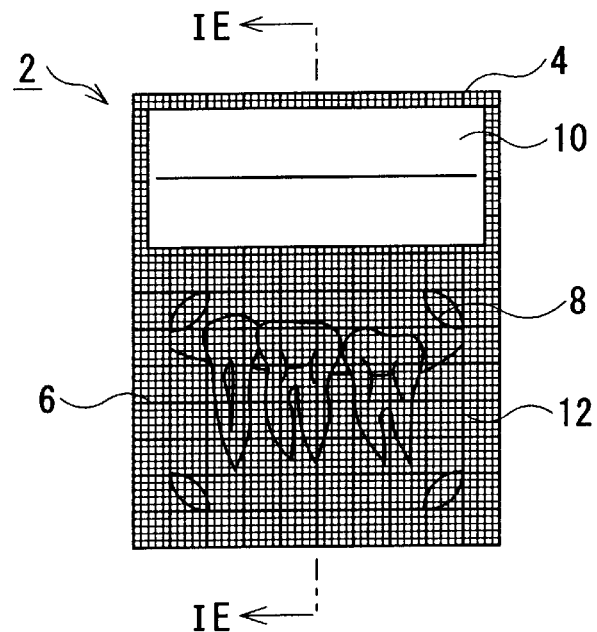
Figure 1E:
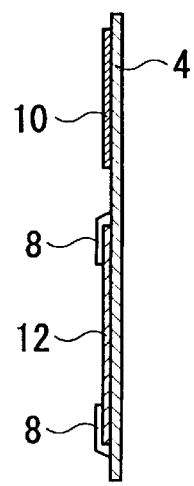
Figure 1F:
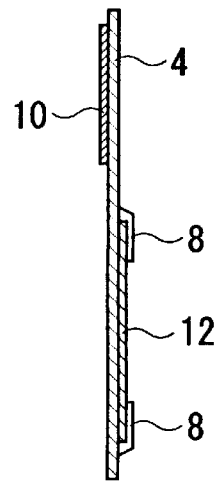

FIGS. 1D through 1F illustrate the X-ray film filing device 2 in use. The dental X-ray film 12 is held in place with corners thereof inserted in the cuts 8. The film 12 may be held on the side of the sticker 10 as shown in FIG. 1E or may be held on the side opposite to the sticker 10 as depicted in FIG. 1F.

Owing to the application of the scale marks 6 to the sheet 4 as described above, the dental X-ray film 12 can be observed in a state overlapped with the scale marks 6. This makes it possible to more precisely determine conditions of individual teeth, relative positions of teeth, and the like. Further, measurements of each tooth (root canal length and the like) are also feasible. The color of the scale marks 6 is not limited specifically, and a suitable color can be chosen depending on the shade of the developed film 12. In the case of a general monochrome film, use of gray scale marks permits easy observation owing to their good matching with the film.

When a measurement is desired from a specific point as an origin in the film 12, it is only necessary to adjust the position of the film 12 such that one of the scale marks 6 or one of crossing points of the scale marks 6 is brought into registration with the origin. If a higher degree of preciseness is desired for a measurement, it is only necessary to apply the scale marks 6 at smaller or finer intervals. The scale marks 6 are not limited to such cross-ruled scale marks, and scale marks in another pattern (scale marks in the form of a cobweb or the like) can be used.

(Second Embodiment)

With reference to FIG. 2A through FIG. 2E, the developed X-ray film filing device according to the second embodiment of the present invention will be described next. The X-ray film filing device, which is indicated generally at numeral 14, is composed of a first sheet 16 having light-transmitting property, a second sheet 18 having light-transmitting property, and a third sheet 20. The second-sheet 18 and the first sheet 16 have been formed by folding a single piece of sheet having light-transmitting property. Except for a free end portion 18a, the second sheet 18 is secured (for example, fusion-bonded) at side portions 18b thereof on the first sheet 16, whereby a bag-shaped, X-ray film pocket 22 is formed. The third sheet 20 is secured at an end portion thereof 20a on the first sheet 16, and its opposite end 20b covers an inlet 22a of the X-ray film pocket 22. On the third sheet 20, a data blank similar to the data sticker 10 in FIG. 1A through FIG. 1F is formed. An adhesive 17 is coated on the back side of the first sheet 16 at an upper end portion thereof. The adhesive 17 is covered by a release film 19. By peeling off the release film 19, the X-ray film filing device 14 can be adhered, for example, on a dental chart or the like with the adhesive 17.

The first sheet 16 is applied with cross-ruled scale marks 6 similar to those applied on the sheet 4 shown in FIG. 1A through FIG. 1F. The cross-ruled scale marks 6 may be applied to the second sheet 18.

Figure 2A:
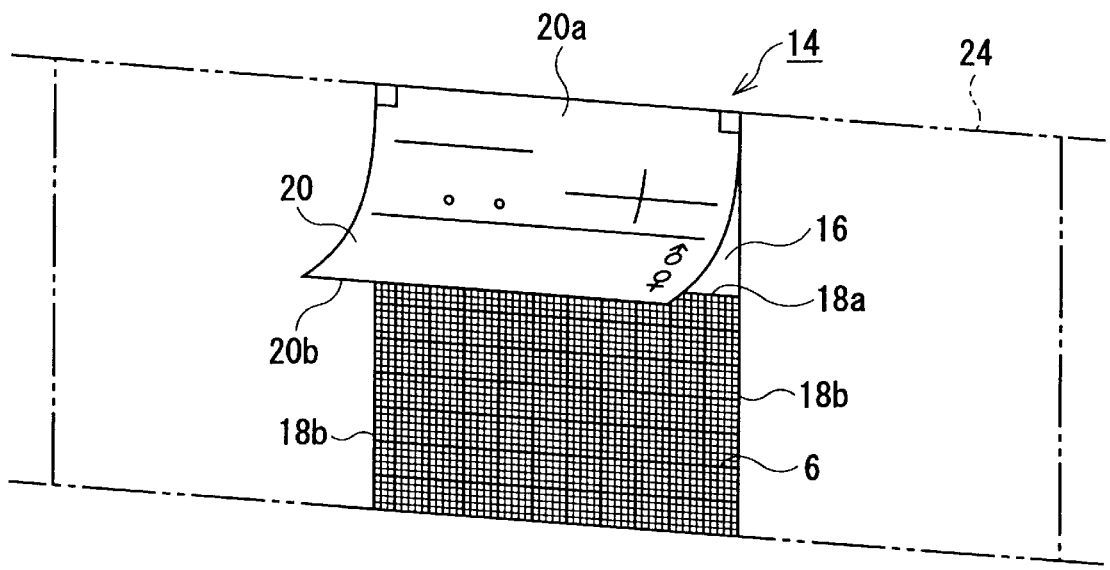
Figure 2B:
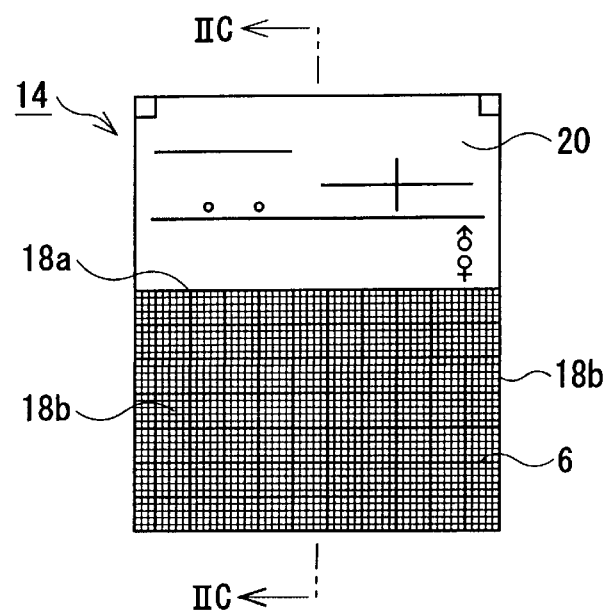
Figure 2C:
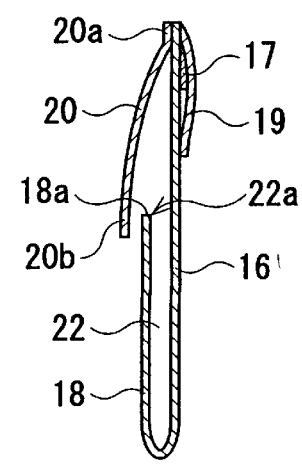
Figure 2D:
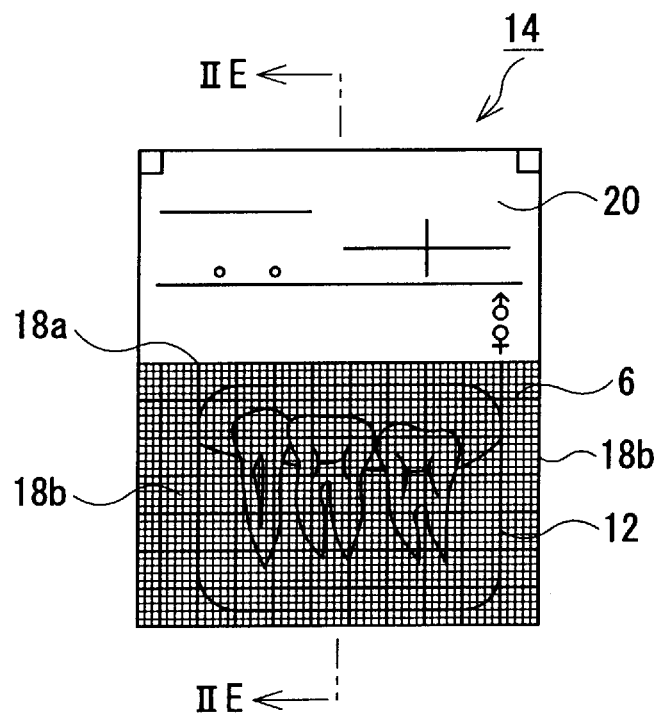
Figure 2E:
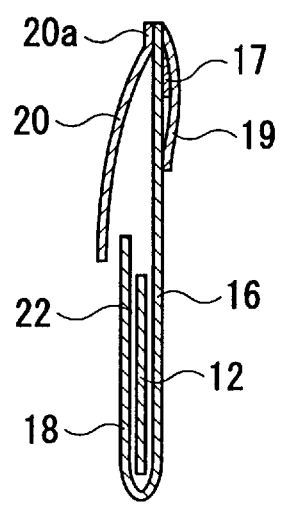

FIGS. 2D and 2E illustrate the X-ray film filing device 14 in use. The dental X-ray film 12 does not fall off from the X-ray film filing device 14, because it is placed within the film pocket 22 and is covered by the third sheet 20. The application of the scale marks 6 to the sheet 16 or 18 makes it possible to observe the dental X-ray film 12 in a state overlapped with the scale marks 6 and hence to bring about similar advantageous effects as the first embodiment.

As is illustrated in FIG. 2A, a plurality of X-ray film filing devices 14 may be formed side by side on an elongated sheet 24, and perforations may be formed between the individual X-ray film filing devices 14 such that they can be cut off individually.

(Third Embodiment)

Figure 4:
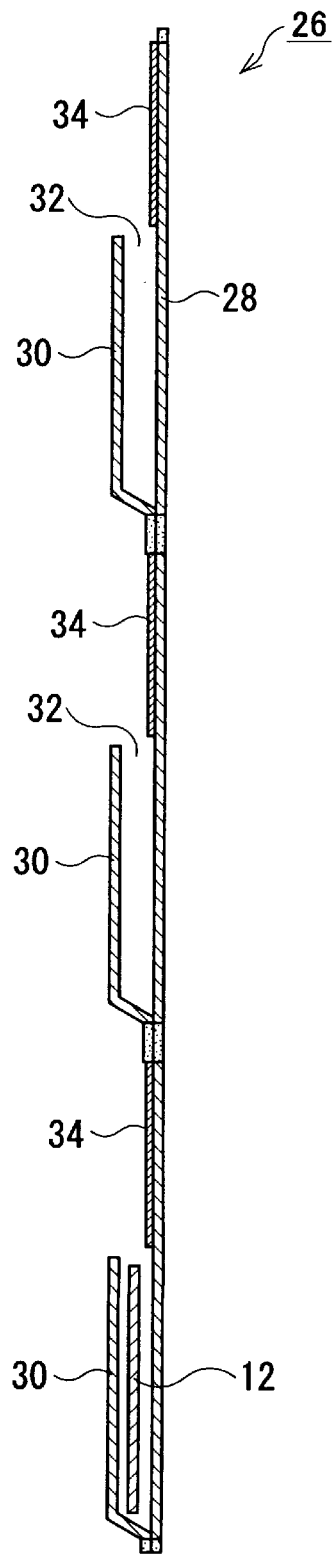
FIG. 4 is a cross-sectional view of the developed X-ray film filing device according to the third embodiment of the present invention, taken in the direction of arrows IV—IV of FIG. 3.

With reference to FIGS. 3 and 4, a description will now be made of the developed X-ray film filing device according to the third embodiment of the present invention. The X-ray film filing device, which is designated generally at numeral 26, is provided with a first sheet 28 having light-transmitting property and plural second sheets 30 having light-transmitting property. These second sheets 30 are secured on the first sheet 28, whereby a number of X-ray film pockets 32 are formed. As is shown in FIG. 3, these X-ray film pocket 32 are divided into three rows by fusion-bonded portions 35 which have been formed continuously extending in a horizontal direction. In each row, five film pockets 32 are formed. These five film pockets 32 are divided by fusion-bonded portions 33, respectively.

Data blanks 34 similar to the data sticker 10 in FIGS. 1A through 1F are formed by printing on the first sheet 28 at locations other than the X-ray film pockets 32. The first sheet 28 is applied with cross-ruled scale marks 6 which are similar to those applied on the sheet 4 in FIGS. 1A, 1B and 1D. The scale marks 6 may be applied to the second sheets 30.

In FIGS. 3 and 4, the dental X-ray film 12 is placed in the X-ray film pocket 32 in the bottom row to show an illustrative example of use. The application of the scale marks 6 to the first sheet 28 or the second sheet 30 makes it possible to observe the dental X-ray film 12 in a state overlapped with the scale marks 6 and hence to bring about similar advantageous effects as the first embodiment.

In FIG. 3, the plural film pockets 32 are formed on the single piece of sheet. A single film pocket may however be formed on a single piece of sheet. The data blanks 34 may be arranged depending on the application purposes and in some instances, may be omitted.

Figure 5A:
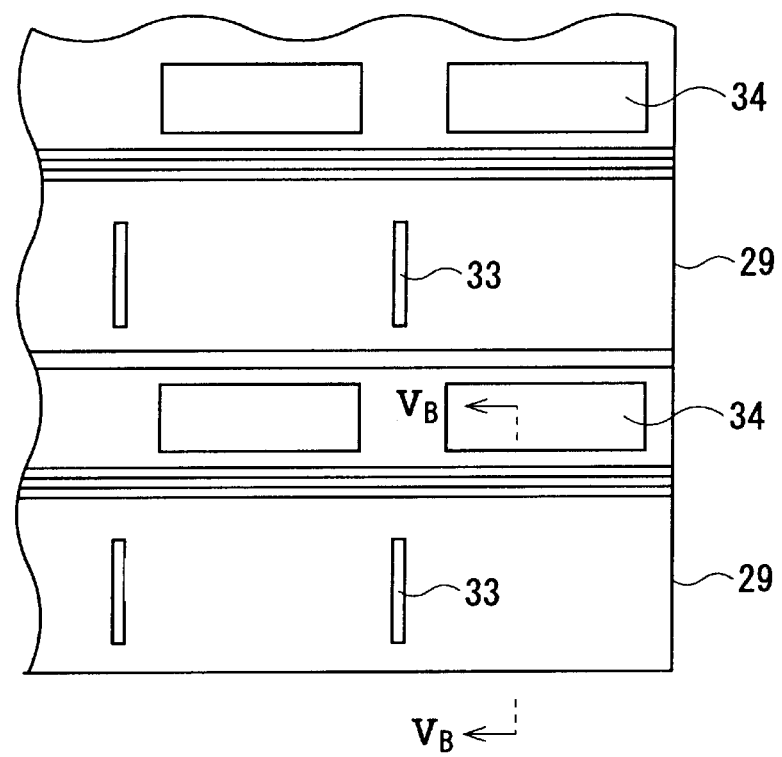
FIG. 5A is a fragmentary front view of a developed X-ray film filing device according to a modification of the third embodiment of the present invention.
Figure 5B:
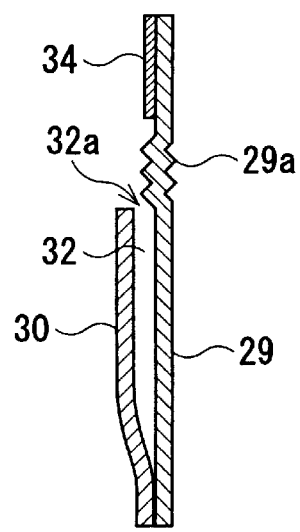
FIG. 5B is a cross-sectional view taken in the direction of arrows VB—VB of FIG. 5A.

Referring next to FIGS. 5A and 5B, the developed X-ray film filing device according to the modification of the third embodiment will be described. In this modification, a first sheet 29 is provided with corrugations 29a such that inlets 32a of pockets 32 are constricted, in other words, made narrower by the corrugations 29a to prevent films from falling out of the pockets 32. The corrugations 29a can be formed, for example, by causing the sheet 29 to undergo thermal deformation. In FIGS. 5A and 5B, elements of structure similar to those shown in FIG. 4 are designated by like reference numerals. The corrugations 29a are formed of three ridges. It is however to be noted that no particular limitation is imposed on the number of ridges and even a single ridge may be used. It is also to be noted that no particular limitation is imposed on the configuration of the ridges. In essence, these ridges may be of any configuration insofar as they can constrict or close the inlet 32a of the pocket 32. To prevent a film from falling out, a sheet has heretofore been arranged covering the film pocket 32 (for example, the sheet 20 in FIGS. 2A through 2E). The design of FIGS. 5A and 5B makes it possible to prevent an X-ray film from falling out and hence to assure filing of the X-ray film by simply deforming the first sheet 29 without needing arrangement of any special member.

(Fourth Embodiment)

Figure 6A:
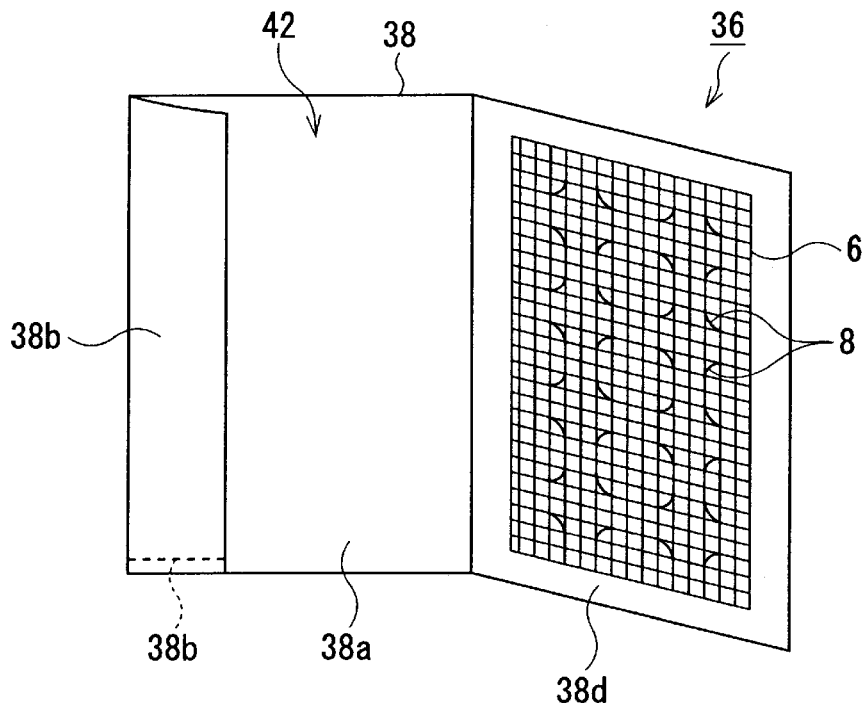
FIG. 6A is a perspective view of a developed X-ray film filing device according to a fourth embodiment of the present invention.
Figure 6B:
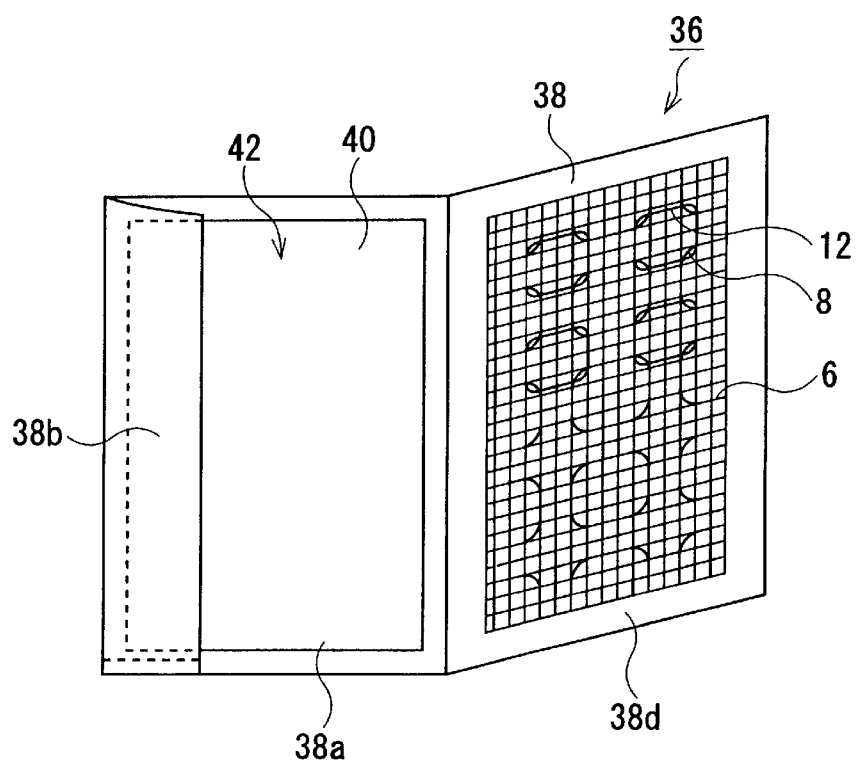
FIG. 6B is a perspective view of the filing device in use.

With reference to FIGS. 6A and 6B, the developed X-ray film filing device according to the fourth embodiment of the present invention will be described. The X-ray film filing device, which is indicated generally at numeral 36, is a film filing device which can also file a document such as a dental chart. The X-ray film filing device 36 is formed by folding a transparent sheet 38 in half, and a document pocket 42 for filing a document such as a dental chart 40 is formed on one 38a of a two-page spread of the sheet 38 by folding an end portion 38b of the sheet 38. A lower end portion 38c of the end portion 38b is fusion-bonded. The other one 38d of the two-page spread of the sheet 38 is provided with cross-ruled scale marks 6 and also with plural cuts 8 in which X-ray films can be inserted at parts thereof for holding the X-ray films there.

FIG. 6B shows the film filing device 36 in use. The dental chart 40 is filed in the document pocket 42, and on the other one 38d of the two-page spread, films 12 are held in the cuts 8.

Use of the above-described film filing device 36 makes it possible to store a document, such as a dental chart, and films together in the same file, and in addition, the application of the scale marks 6 to the sheet 38 makes it possible to observe each dental X-ray film 12 in a state overlapped with the scale marks 6. It is therefore possible to obtain similar advantageous effects as the first embodiment. In this embodiment, each film 12 is held in place by the cuts 8. The holding method of each film 12 is however not limited to the use of the cuts, and each film 12 may be secured on the sheet, for example, by using an adhesive tape or the like.

(Fifth Embodiment)

Referring to FIG. 7A through FIG. 7E, the developed X-ray film filing device according to the fifth embodiment will be described. The X-ray film filing device of this embodiment, which is designated generally at numeral 44, is used as a slide for projection. The X-ray film filing device 44 is composed of two mount members 46, which define openings 45 therethrough and are adapted to hold the X-ray film 12 therebetween, and transparent sheets 48 covering the openings 45, respectively. The transparent sheet 48 are adhered on the corresponding mount members 46, respectively. These two mount members 46 are provided at end portions thereof with concavities and convexities, respectively. By fitting these concavities and convexities with each other, the two mount members 46 are united together.

Figure 7D:
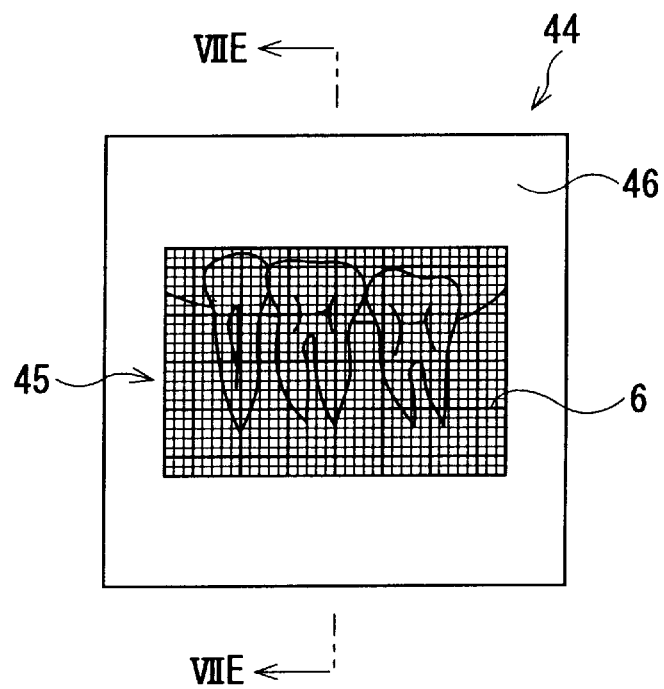
Figure 7E:
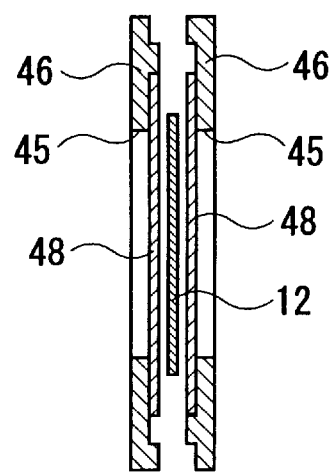

As is shown in FIGS. 7A, 7B and 7D, scale marks 6 are applied to one of the sheets 48, said one sheet 48 being positioned on a front side, in a similar manner as in the sheet 4 in FIGS. 1A through 1F. In contrast, the scale marks 6 may also be applied to the other sheet 48 which is positioned on a rear side.

Owing to the application of the scale marks 6 on one of the sheets 48, use of the above-described film filing device 44 makes it possible to project an image of the dental X-ray film 12 in a state overlapped with the scale marks 6, thereby bring about similar advantageous effects as the first embodiment.

(Sixth Embodiment)

Figure 8A:
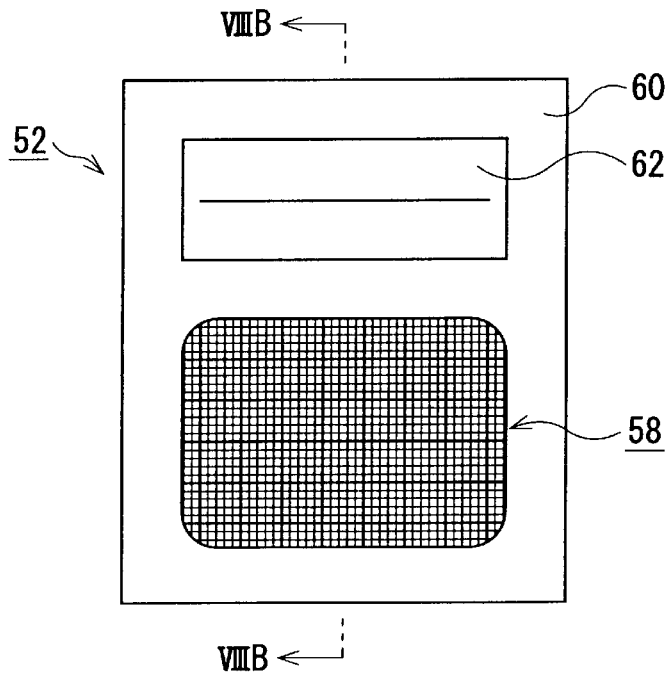
Figure 8B:
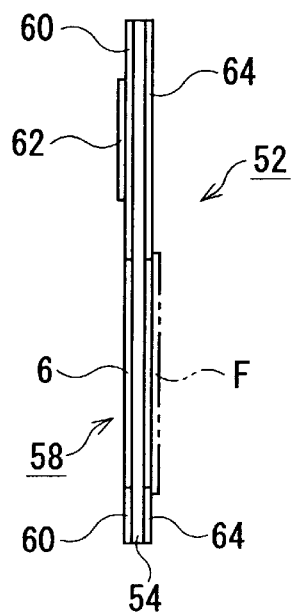
Figure 8C:
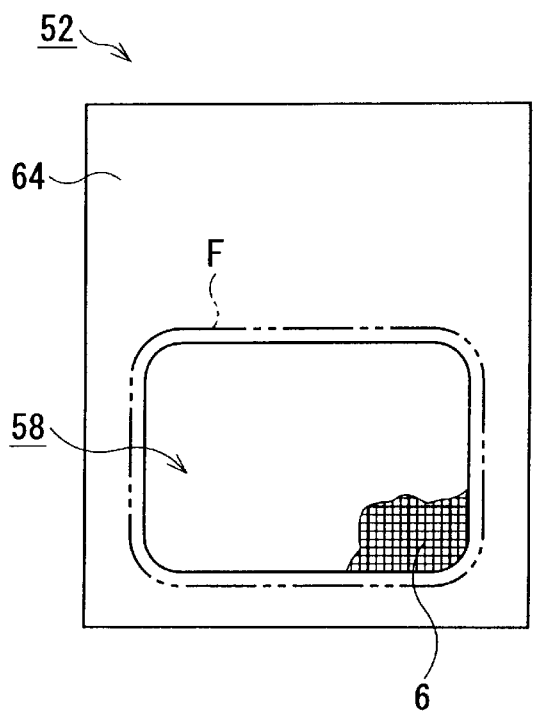

Referring to FIGS. 8A through 8C, the developed X-ray film filing device according to the sixth embodiment of the present invention will be described. The X-ray film filing device, which is indicated generally at numeral 52, has a transparent sheet 54 (for example, a transparent PVC sheet), and a window 58 with cross-ruled scale marks 6 applied at 1 mm intervals by printing or the like is formed on a front side of the sheet 54 (i.e., the side shown in FIG. 8A). The front side of the sheet 54 is colored at an area other than the area of the window 58 and in this embodiment, is printed in a dark color (for example, in a gray color somewhat darker than the color of a dental X-ray film F, or in a black color) to form a printed area 60. The window 58 is formed slightly smaller than the dental X-ray film F (3×4 cm).

In an upper part of the area 60 printed in the dark color, a data blank 62 is printed, for example, in a white color.

On a rear side of the sheet 54 (i.e., the side shown in FIG. 8C), an adhesive layer 64 is formed by applying an adhesive to the area other than the window 58. The adhesive layer 64 may be covered with a sheet of release paper (not shown) as needed.

Figure 9:
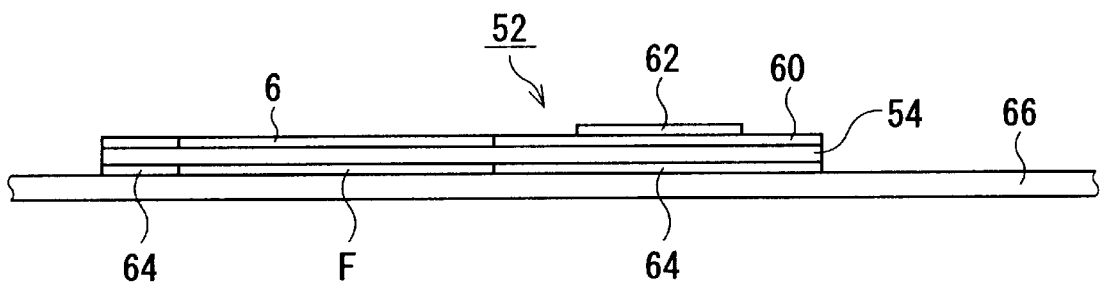
FIG. 9 is a side view of the developed X-ray film filing device according to the sixth embodiment of the present invention in use.

A description will next be made about a method for using the filing device 52. As is shown in FIG. 8C, the X-ray film F is first applied to the adhesive layer 64 on the rear side of the X-ray film filing device 52 such that the X-ray film F is registered with the window 58. The X-ray film filing device 52 is then bonded to a transparent or translucent mount 66 as shown in FIG. 9. The X-ray film F is secured in a state held between the film filing device 52 and the mount 66.

The filing of the dental X-ray film F in the manner described above makes it possible to firmly secure the film F on the mount 66 and to observe it in a state overlapped with the scale marks 6. As a consequence, the condition of each tooth, relative positions of teeth, or the like can be precisely determined. Further, measurements of each tooth (root canal length and the like) are also feasible. The color of the scale marks 6 is not limited specifically, and a suitable color can be chosen depending on the shade of the developed film F.

When a measurement is desired from a particular point as an origin in the film F, it is only necessary to position the film F such that one of the scale marks 6 or one of crossing points of the scale marks is brought into registration with the origin. This makes it possible to measure a length precisely. If a higher degree of preciseness is desired for a measurement, it is only necessary to apply the scale marks 6 at smaller or finer intervals. The scale marks 6 are not limited to such cross-ruled scale marks, and scale marks in another pattern (scale marks in the form of a cobweb or the like) can be used.

(Seventh Embodiment)

Figure 11:
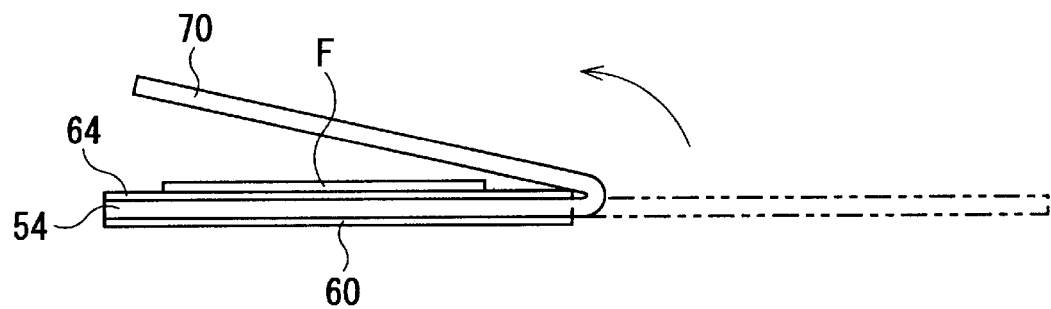
FIG. 11 is a bottom view of the developed X-ray film filing device according to the seventh embodiment of the present invention in use.
Figure 10A:
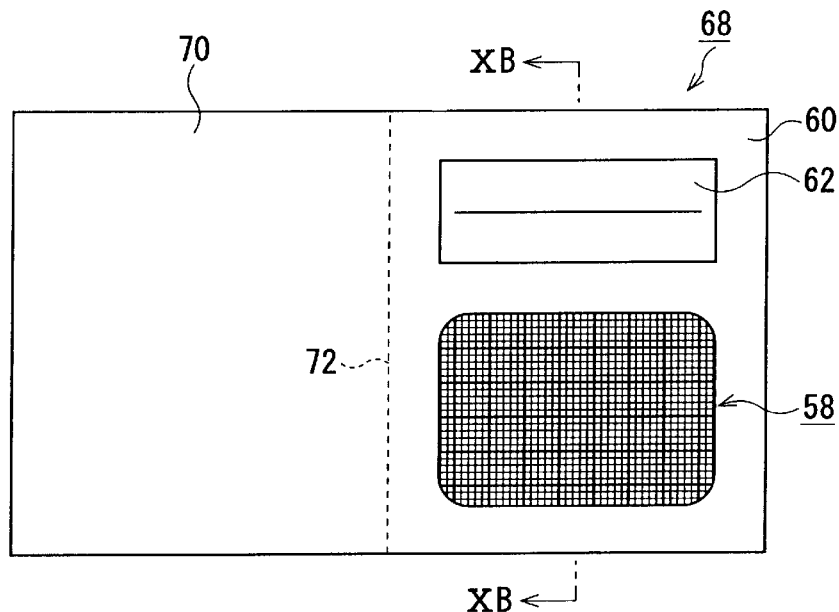
Figure 10B:
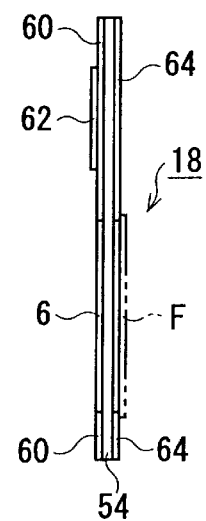
Figure 10C:
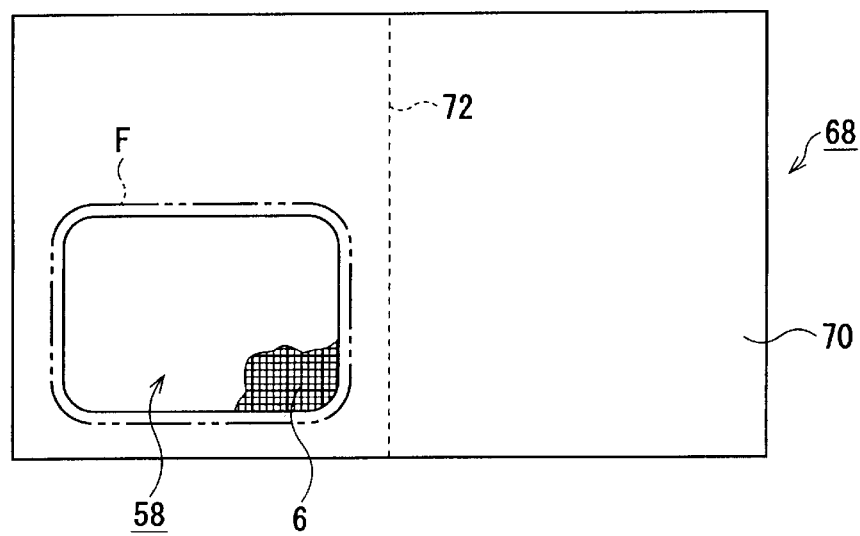

Referring to FIGS. 10A through 10C and FIG. 11, the developed X-ray film filing device according to the seventh embodiment of the present invention will be described. In this embodiment, the X-ray film filing device which is designated generally at numeral 68 is provided in adjacent to the window 58 with a cover sheet 70 having light-transmitting property (transparency or translucence) such that the cover sheet 70 may be folded to cover the window 58. The remaining construction is the same as the corresponding construction in FIGS. 8A through 8C. The cover sheet 70 is folded backward along a folding line 72 which is indicated by a dashed line. As is depicted in FIG. 11, the film F is held between the sheet 54 and the cover sheet 70, and the cover sheet 70 is bonded to the adhesive layer 64 to secure the film F.

The filing of the dental X-ray film F in the manner described above makes it possible to secure the film F and to observe it in a state overlapped with the scale marks 6 without needing using the mount 66 as in the sixth embodiment illustrated in FIG. 9. The filing device 68 according to the seventh embodiment of the present invention can bring about similar advantageous effects as the filing device shown in FIGS. 8A through 8C. Further, the film filing device 68 can also be used as a slide for projection.

In the seventh embodiment described above, the window 58 was formed integrally with the sheet 54. The present invention is however not limited to such integral formation, and the window 58 and the sheet 54 may be formed as discrete members. The window 58 and the adhesive layer 64 may be arranged on the same side of the sheet 54 although they were arranged on the different sides of the sheet 54 in the above-described seventh embodiment.

What is claimed is:

1. A developed X-ray film filing device for filing a developed X-ray film comprising:

a transparent sheet which has scale marks applied thereon and which is arranged such that a particular site appearing on the X-ray film can be diagnosed using said scale marks; and an X-ray film pocket for filing the X-ray film therein and being formed by two transparent sheets one of which is said transparent sheet with said scale marks applied thereon;

wherein the device is provided with a third sheet which covers an inlet of said X-ray film pocket to prevent said X-ray film from falling out of the X-ray film pocket.

2. A developed X-ray film filing device according to claim 1, wherein the device is provided with a data blank.

3. A developed X-ray film filing device according to claim 1, wherein said third sheet is provided with a data blank formed thereon.

4. A developed X-ray film filing device according to claim 1, wherein said transparent sheet with said scale marks applied thereon is arranged such that upon diagnosis, said transparent sheet can be brought into contact with the X-ray film.

* * * * *